United States Patent
Peng et al.

(10) Patent No.: US 8,588,305 B2
(45) Date of Patent: Nov. 19, 2013

(54) TWO-DIMENSIONAL INTERPOLATION ARCHITECTURE FOR MOTION COMPENSATION IN MULTIPLE VIDEO STANDARDS

(75) Inventors: Yong Peng, Shanghai (CN); Zheng Wei Jiang, Shanghai (CN); Frans Sijstermans, Los Altos, CA (US); Stefan Eckart, Munich (DE)

(73) Assignee: Nvidia Corporation, Santa Clara, CA (US)

( * ) Notice: Subject to any disclaimer, the term of this patent is extended or adjusted under 35 U.S.C. 154(b) by 1078 days.

(21) Appl. No.: 12/143,551

(22) Filed: Jun. 20, 2008

(65) Prior Publication Data

US 2009/0168885 A1    Jul. 2, 2009

(30) Foreign Application Priority Data

Dec. 29, 2007    (CN) .......................... 2007 1 0308372

(51) Int. Cl.
*H04N 7/12*    (2006.01)

(52) U.S. Cl.
USPC ....................... 375/240.16; 382/300; 348/550

(58) Field of Classification Search
USPC .................. 375/240, 240.15, 240.16, 240.21, 375/240.29, 350; 382/300, 275; 708/401; 345/660; 348/550
See application file for complete search history.

(56) References Cited

U.S. PATENT DOCUMENTS

| | | | | |
|---|---|---|---|---|
| 5,416,522 A * | 5/1995 | Igarashi | ................... | 375/240.15 |
| 5,420,891 A * | 5/1995 | Akansu | ........................ | 375/350 |
| 5,550,765 A * | 8/1996 | Bhattacharya et al. | ....... | 708/401 |
| 6,072,834 A * | 6/2000 | Kim et al. | ..................... | 375/240 |
| 6,665,344 B1 * | 12/2003 | Fimoff | ....................... | 375/240.2 |
| 7,551,806 B2 * | 6/2009 | Wang et al. | .................... | 382/300 |
| 8,253,856 B1 * | 8/2012 | Alvarez et al. | ................ | 348/550 |
| 2002/0037053 A1 * | 3/2002 | Kim | ......................... | 375/240.21 |
| 2005/0180655 A1 * | 8/2005 | Ohta et al. | ..................... | 382/275 |
| 2006/0291563 A1 * | 12/2006 | Park et al. | ................. | 375/240.17 |
| 2007/0104394 A1 * | 5/2007 | Chou | ............................ | 382/300 |
| 2008/0165863 A1 * | 7/2008 | Yan | ............................ | 375/240.29 |
| 2011/0292082 A1 * | 12/2011 | MacInnis et al. | ............. | 345/660 |

\* cited by examiner

*Primary Examiner* — Michael Thier
*Assistant Examiner* — Vincelas Louis
(74) *Attorney, Agent, or Firm* — Patterson + Sheridan L.L.P.

(57) ABSTRACT

The present invention provides an apparatus for interpolation which is able to process input data with multiple video standards without sacrificing chip area. The interpolation unit comprises: a first interpolation unit for interpolating input data; a second interpolation unit for interpolating input data; a filter indicator for providing information to the first interpolation unit and the second interpolation unit; and an output unit for multiplexing and averaging output from the first interpolation unit and the second interpolation unit. The present invention also provides a motion compensation unit and a decoder for processing multiple video standards.

20 Claims, 6 Drawing Sheets

TWO-DIMENSIONAL INTERPOLATION ARCHITECTURE FOR MOTION COMPENSATION IN MULTIPLE VIDEO STANDARDS

CROSS-REFERENCE TO RELATED APPLICATIONS

This application claims benefit of Chinese patent application number 200710308372.0, filed Dec. 29, 2007, which is herein incorporated by reference.

FILED OF INVENTION

The present invention relates to motion compensation for multiple video standards, and, more specifically, to a two-dimensional interpolation architecture of motion compensation to comply with multiple video standards.

BACKGROUND

Digital video streams are typically encoded using one of many different encoding standards. There are currently a large number of video encoding standards, and new standards are frequently emerging. Examples of current video encoding standards include JPEG (Joint Photographic Experts Group), MPEG (Moving Pictures Experts Group), MPEG-2, MPEG-3, MPEG-4, H.263, H.263+, H.264, and proprietary standards such as Real Video and Windows Media. In order to fully realize the benefits of digital video, a user requires access to encoder and/or decoder that are capable of processing all common encoding standards.

Currently, motion compensation in a video encoding/decoding process for each video standard requires different pipelines, so that a large chip area is occupied in order to achieve motion compensation for multiple video standards. However, chip area is limited, and what is needed is a motion compensation apparatus that is able to process different video standards and also meet chip area requirement.

SUMMARY OF INVENTION

To solve the above problems, an embodiment of the present invention provides an apparatus for interpolation. The apparatus for interpolation comprises a first interpolation unit for interpolating input data; a second interpolation unit for interpolating input data; a filter indicator for providing information to the first interpolation unit and the second interpolation unit; and an output unit for multiplexing and averaging output from the first interpolation unit and the second interpolation unit.

Another embodiment of the present invention provides an apparatus for motion compensation. The apparatus for motion compensation comprises an interpolation unit for interpolation of reference data into input data; a discrete cosine transform (DCT) unit for performing discrete cosine transform of output of the interpolation unit; a quantization unit for performing quantization of output of the DCT unit; and a feedback unit. The interpolation unit therein further comprises a first interpolation unit for interpolating input data; a second interpolation unit for interpolating input data; a filter indicator for providing information to the first interpolation unit and the second interpolation unit; and an output unit for multiplexing and averaging output from the first interpolation unit and the second interpolation units.

Another embodiment of the present invention provides a video decoder with motion compensation. The video decoder comprises an inverse DCT unit for performing inverse DCT of input data; an inverse quantization unit for performing inverse quantization of output of the inverse DCT unit; a frame memory for storing frame output of the inverse quantization unit; and a motion compensation unit for performing motion compensation of data stored in the frame memory and feeding an output into an adder which adds output of the inverse quantization unit to output of the motion compensation. The motion compensation unit therein comprises an interpolation unit for interpolation of reference data into input data, the interpolation unit further comprising a first interpolation unit for interpolating input data; a second interpolation unit for interpolating input data; a filter indicator for providing information to the first interpolation unit and the second interpolation unit; and an output unit for multiplexing and averaging output from the first interpolation unit and the second interpolation unit.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is discussed here, and generally, conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in a computer or other processing system. It has proven convenient at times, principally for reasons of common usage, to refer to these signals as bits, values, elements, symbols, characters, terms, numbers, or the like.

The following discloses preferred embodiments of the unified inverse discrete cosine transform (IDCT) microcode processor engine, which are able to facilitate IDCT of various video standards without sacrificing speed. The video standards include, without limitation, ISO/IEC 13253 (also known as MPEG-2), ISO/IEC 14496 (also known as MPEG-4), ISO/IEC 14496-10 (also known as H.264/AVC) and SMPTE 421M (also known as VC-1).

Figure 1:
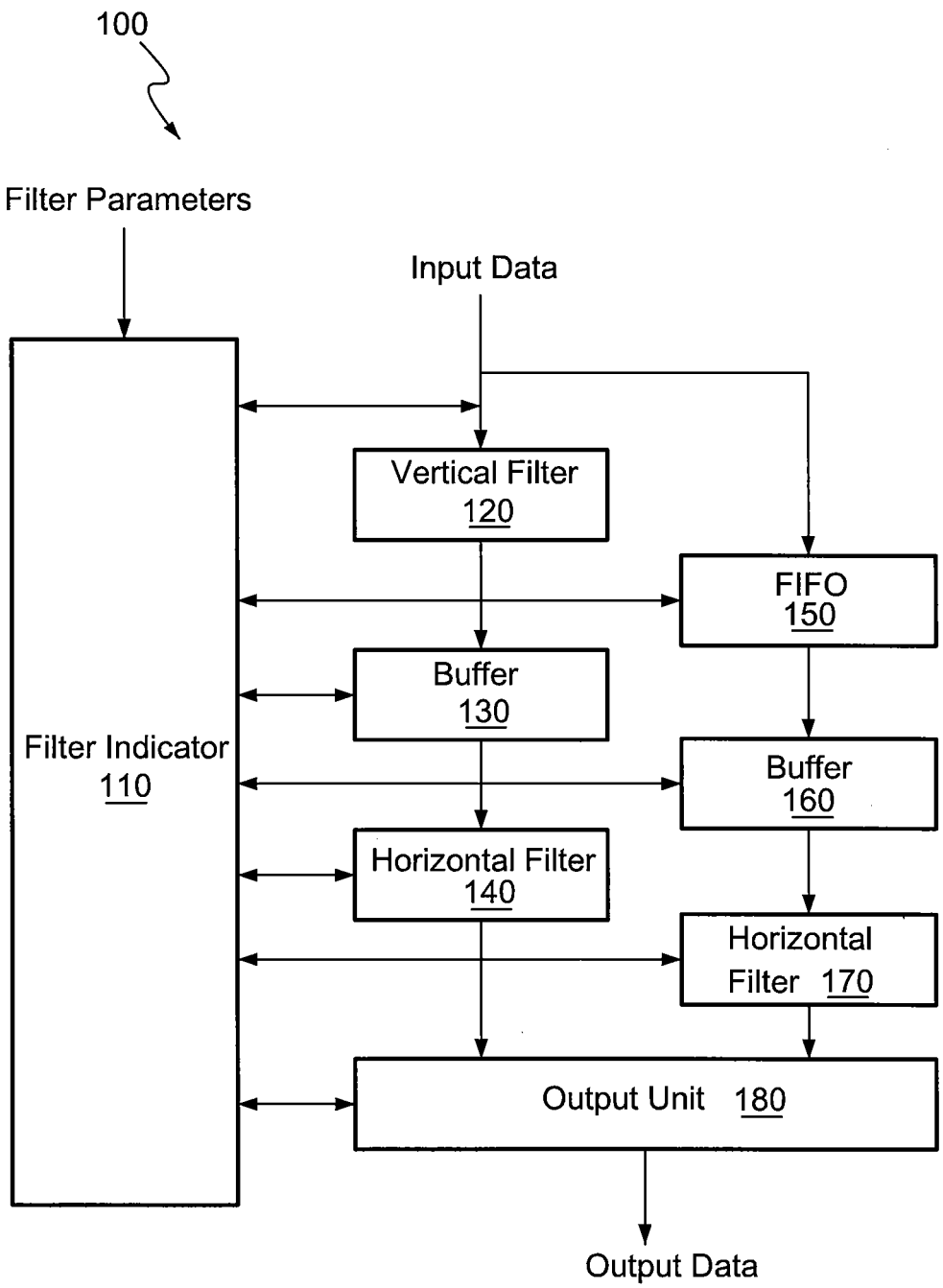
FIG. 1 illustrates a simplified block diagram of an interpolation unit according to an embodiment of the present invention.

FIG. 1 illustrates a simplified block diagram of an interpolation unit 100 according to an embodiment of the present invention. The interpolation unit 100 comprises a filter indicator 110, a vertical filter 120, a buffer 130, a horizontal 140, a FIFO buffer 150, a buffer 160, a horizontal filter 170 and an output unit 180. As shown in FIG. 1, filter indicator 110 receives filter parameters and provides information required by vertical filter 120, buffers 130 and 140, FIFO 150, horizontal filters 140 and 170, and output unit 180. Vertical filter 120 performs vertical filtering on input data and the filtered input data is then stored in buffer 130. Horizontal filter 140 performs horizontal filtering 140 on data stored in buffer 130. FIFO 150 manipulates input data into the first-in first-out order and stores them in buffer 160. Subsequently, horizontal filter 170 performs horizontal filtering on data stored in buffer 160. Output unit 180 multiplexes and averages output from horizontal buffers 140 and 170.

Figure 2:
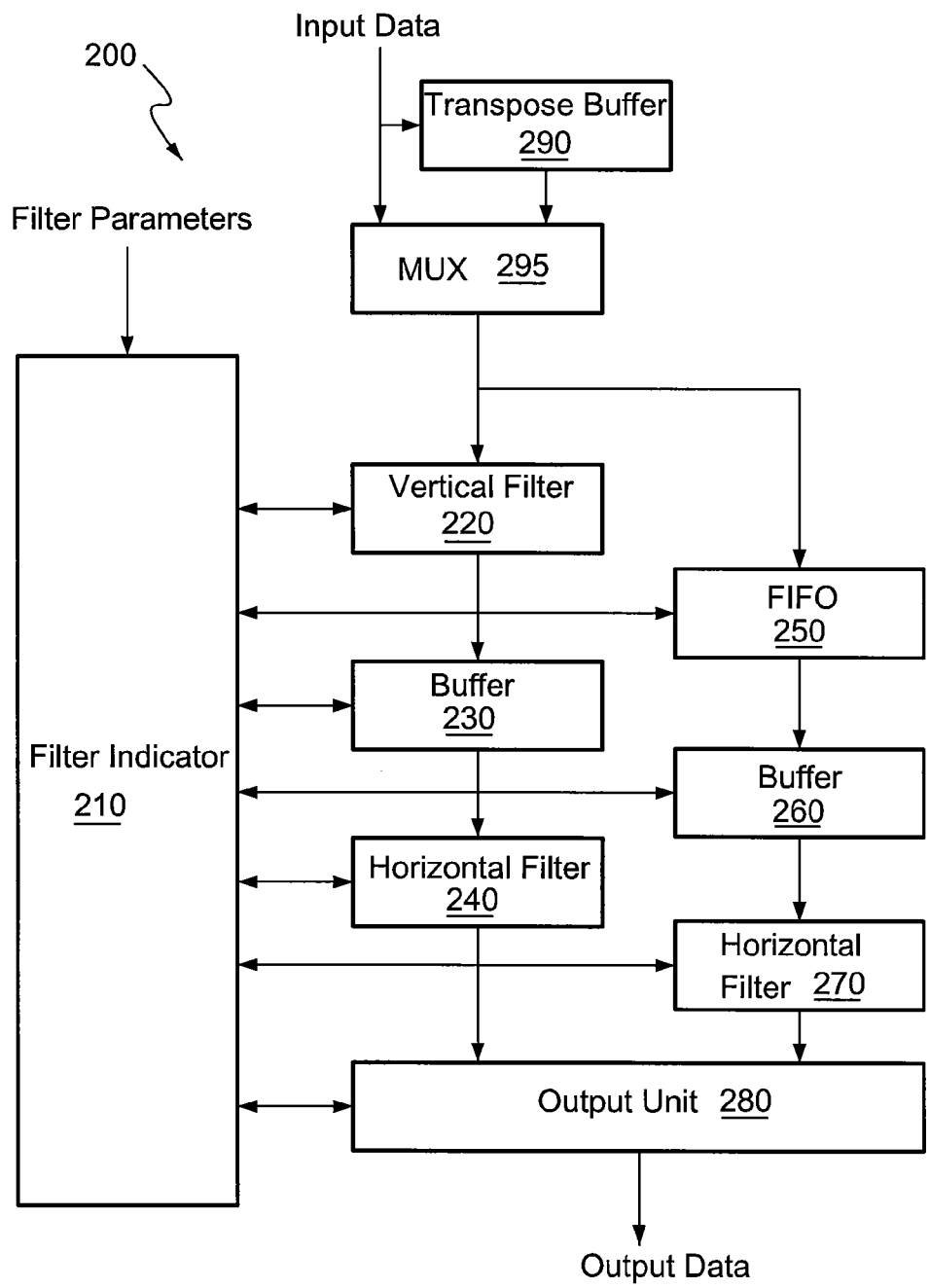
FIG. 2 illustrates a simplified block diagram of an interpolation unit according to another embodiment of the present invention.

Interpolation unit 100 is able to facilitate video interpolation for VC1, H264 and MPEG-2 standards. For MPEG-4 standard, the input data need to be transposed before they are fed into the two pipelines, since the interpolation of MPEG-4 input data need to be horizontally filtered. FIG. 2 illustrates a simplified block diagram of an interpolation unit 200 according to another embodiment of the present invention. As shown in FIG. 2, interpolation unit 200 further comprises a transpose buffer 290 and a multiplexer 295, which are configured to facilitate input data of MPEG-4 standards. As a result, interpolation unit 200 is able to interpolate input data of VC1, H264, MPEG-2 and MPEG-4 standards.

Figure 3:
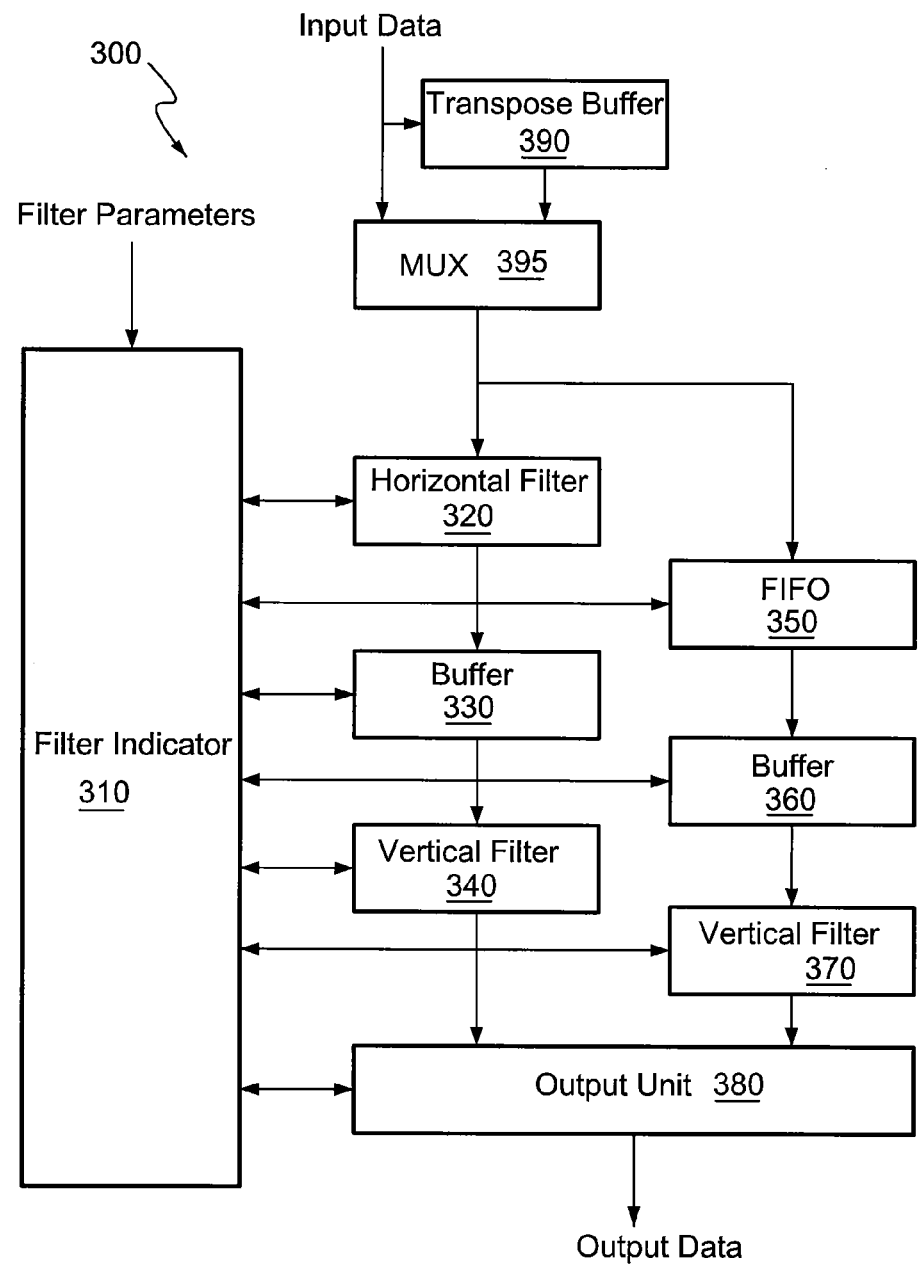
FIG. 3 illustrates a simplified block diagram of an interpolation unit according to yet another embodiment of the present invention.

FIG. 3 illustrates a simplified block diagram of an interpolation unit 300 according to yet another embodiment of the present invention. Interpolation unit 300 is also able to facilitate VC1, H264, MPEG-2 and MPEG-4 standards. Input data of H264, MPEG-2 and MPEG-4 standards are not transposed before they are fed into the two pipelines, meaning that input data of H264, MPEG-2 and MPEG-4 standards are fed into horizontal filter 320 and FIFO 350 without transposing. Input data of VC1 standard is transposed by transpose buffer 390 before they are fed into the two pipelines.

To build a vertical filter for multiple video standards, a common vertical filter equation is formed by merging multiple filter equations. Vertical filter equations of the video standards are 2-tap (bilinear), 4-tap (bicubic), 6-tap and 8-tap. Each one of the vertical filter equations is displayed below.

2-Tap (Bilinear)

$V\_0a = (8*x[0]).>>3$ $V\_0b = (6*x[0]+2*x[1]).>>3$ $V\_0c = (4*x[0]+4*x[1]).>>3$ $V\_0d = (2*x[0]+6*x[1]).>>3$

4-Tap (Bicubic)

$v1a = (x[1]<<6 + rnd\_out(shift))>>s$ $v1b = ((S16(-4*x[0]+53*x[1]+18*x[2]-3*x[3])) + rnd\_out(shift)))>>3$ $v1c = ((S14(-(x[0]+x[3])+9*(x[1]+x[2])))<<2 + rnd\_out(shift)))>>5$ $v1d = ((S16(-3*x[0]+18*x[1]+53*x[2]-4*x[3])) + rnd\_out(shift)))>>6$ 6-Tap $v2 = (S15((x[0]+x[5])-5*(x[1]+x[4])+20*(x[2]+x[3]))$ 8-Tap $V3 = (20(x[3]+x[4])-6(x[2]+x[5])+3(x[1]+x[6])-(x[0]+x[5])+frnd())>>5$ For the above equations, $rnd\_out(shift) = (shift==0)? (!rnd ? 4:3): ((shift==2)? (!rnd ? 16:15) :(!rnd ? 32:31));$ $s = mux(shift) = (shift==0)? 3: ((shift==2)? 5:6).$ The 4-tap, 6-tap and 8-tap equations are rearranged as shown in the following equations.

$v3 = (2*(8+2)*(x[3]+x[4])-(4+2)*(x[2]+x[5])+2*(x[1]+x[6])-(x[0]+x[7])+(x[1]+x[6])+frnd())>>5$ $v2 = (2*(8+2)*(x[3]+x[2])-(4+1)*(x[1]+x[4])+x[0]+x[5]+frnd())>>0;$ $v1a = (4*(16*x[1]+0)+frnd())>>s;$ $v1b = (2*(8+1)*(x[1]+x[2])-(4+0)*(x[0]+x[3])+2*(16*x[1]+x[1])+x[3]+x[1]+frnd())>>3;$ $v1c = (4*(8+1)*(x[1]+x[2])-(4+0)*(x[0]+x[3])+frnd())>>5;$ $v1d = (2*(8+1)*(x[1]+x[2])-(4+0)*(x[0]+x[3])+2*(16*x[2]+x[2])+x[0]+x[2]+frnd())>>6;$ $v0a = (2*(1+1)*(x[0]+x[0])).>>3$ $v0b = (2*(x[1]+x[0])+2*(x[0]+x[0])+(x[0]+x[0])).>>3$ $v0c = (2*(1+1)*(x[1]+x[0])).>>3$ $v0d = (2*(x[1]+x[0])+2*(x[1]+x[1])+(x[1]+x[1])).>>3$ A common vertical filter equation, as shown below is formed for 4-tap, 6-tap and 8-tap equations.

$V = (r*(h+t)*(a[]+a[1])-(q+u)*(a[2]+a[3])+v*(p*a[4]+w*a[5])+a[6]+a[7]+frnd())>>s;$ wherein frnd( ) = 6-tap ? 0: rnd_out(shift);
 s = (shift==0)? 3: ((shift==2)? 5: 6);
 r is mux(0,2,4);
 h is mux(0,1,2,4);
 t is mux(0,1,2);

q is mux(0,4);
u is mux(0,1,2);
v is mux(2,4);
v is mux(2,4);
w is mux(0,1);
s is mux(3,5,6,0);
a[0] is mux(x[0],x[1],x[3]);
a[1] is mux(x[0]x[2],x[4]);
a[2] is mux(x[0],x[1],x[2]);
a[3] is mux(x[3],x[4],x[5]);
a[4] is mux(16*x[1],16*x[2],0,x[6]);
a[5] is mux(x[1],x[2],0);
a[6] is mux(x[0],x[3],0);
a[7] is mux(x[1],x[2],x[5],0,x[7])

Figure 4:
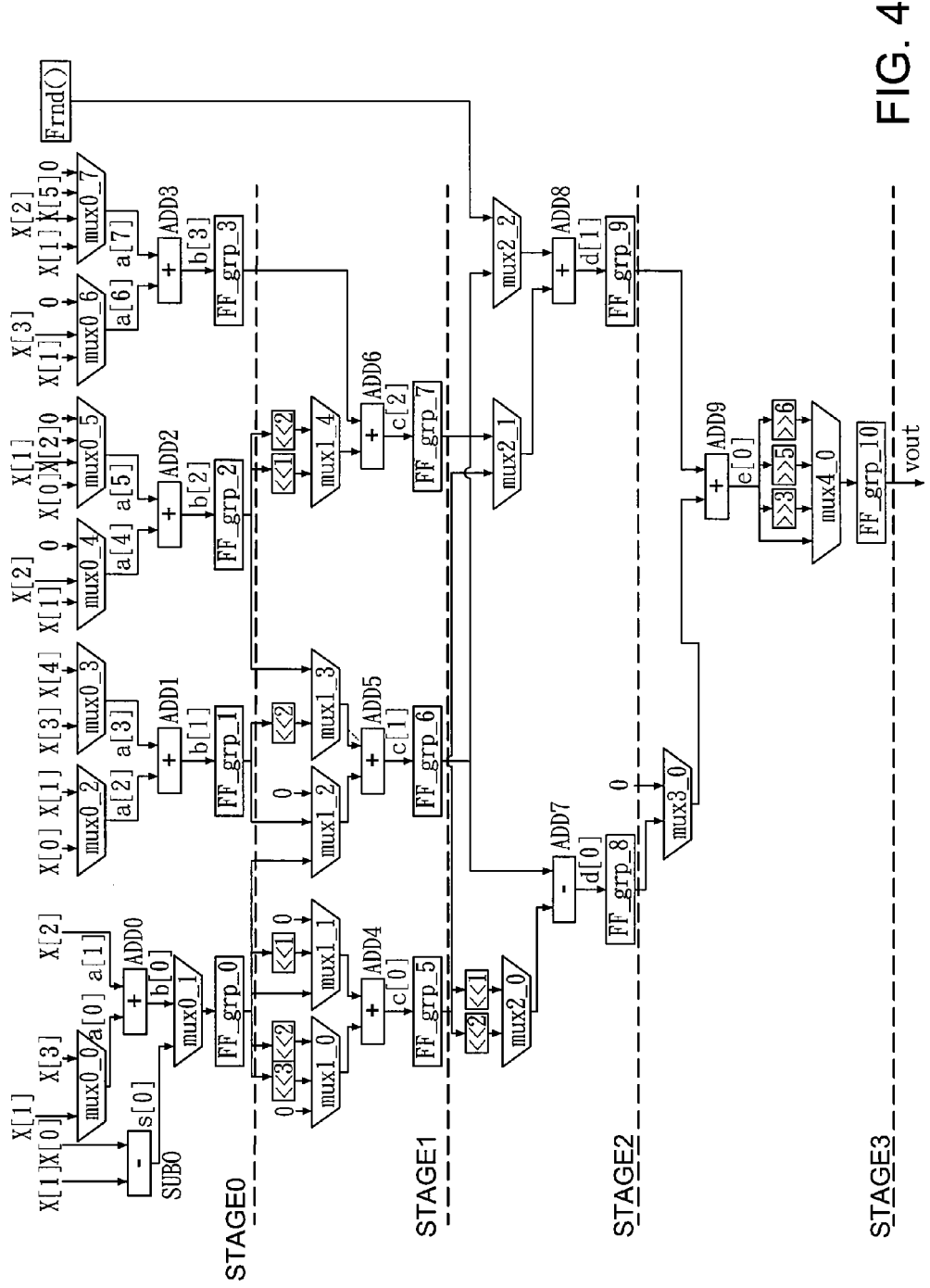
FIG. 4 illustrates example architecture of vertical filters according to an embodiment of the present invention.

The common vertical filter equation obtained can be realized by shifters, adders, subtracters and multiplexers. FIG. 4 illustrates example architecture of vertical filters 120, 220, 340 and 370, which is a realization of the common vertical filter equation.

Similarly, a common horizontal filter equation is obtained by merging horizontal filter equations of multiple video standards. The filter equations are shown below.

2-Tap (Bilinear)

$h0a$=Clip1((8*$x$[0]).+)+$rnd\_out$( )>>3)

$h0b$=Clip1((6*$x$[0]+2*$x$[1]))+$rnd\_out$( )>>3)

$h0c$=Clip1((4*$x$[0]+4*$x$[1]))+$rnd\_out$( )>>3)

$h0d$=Clip1((2*$x$[0]+6*$x$[1]))+$rnd\_out$( )>>3)

4-Tap (Bicubic)

$h1a$=Clip1(($x$[1]<<7+$rnd\_out$( ))>>7)

$h1b$=Clip1(((S16(-4*$x$[0]+53*$x$[1]+18*$x$[2]-3*$x$[3]))+$rnd\_out$( )))>>7)

$h1c$=Clip1(((S14(-($x$[0]+$x$[3])+9*($x$[1]+$x$[2]))+$rnd\_out$( )))>>7)

$h1d$=Clip1(((S16(-3*$x$[0]+18*$x$[1]+53*$x$[2]-4*$x$[3]))+$rnd\_out$( )))>>7)

6-Tap $h2$=Clip1((S20(($x$[0]+$x$[5])-5*($x$[1]+$x$[4])+20*($x$[2]+$x$[3]))+512)>>10)

8-Tap $h3$=(2*(8+2)*($x$[3]+$x$[4])-(4+2)*($x$[2]+$x$[5])+2*($x$[1]+$x$[6])-($x$[0]+$x$[7])+($x$[1]+$x$[6])+$frnd$( ))>>5

For the above equations, the rnd_out(shift) is 4-tap: $rnd\_out$( )=(!$rnd$ ? 64: 63)

2-tap: $rnd\_out$( )=(!$rnd$ ? 32: 31)

By merging the horizontal filter equations, the common horizontal filter equation is obtained as shown below.

$H$=Clip1(($r$*($h$+$t$)*($a$[0]+$a$[1])-($w$+$u$)*($a$[2]+$a$[3])+$v$*($p$*$a$[4]+$w$*$a$[5])+$a$[6]+$a$[7]+$frnd$( )>>$s$)

Figure 5:
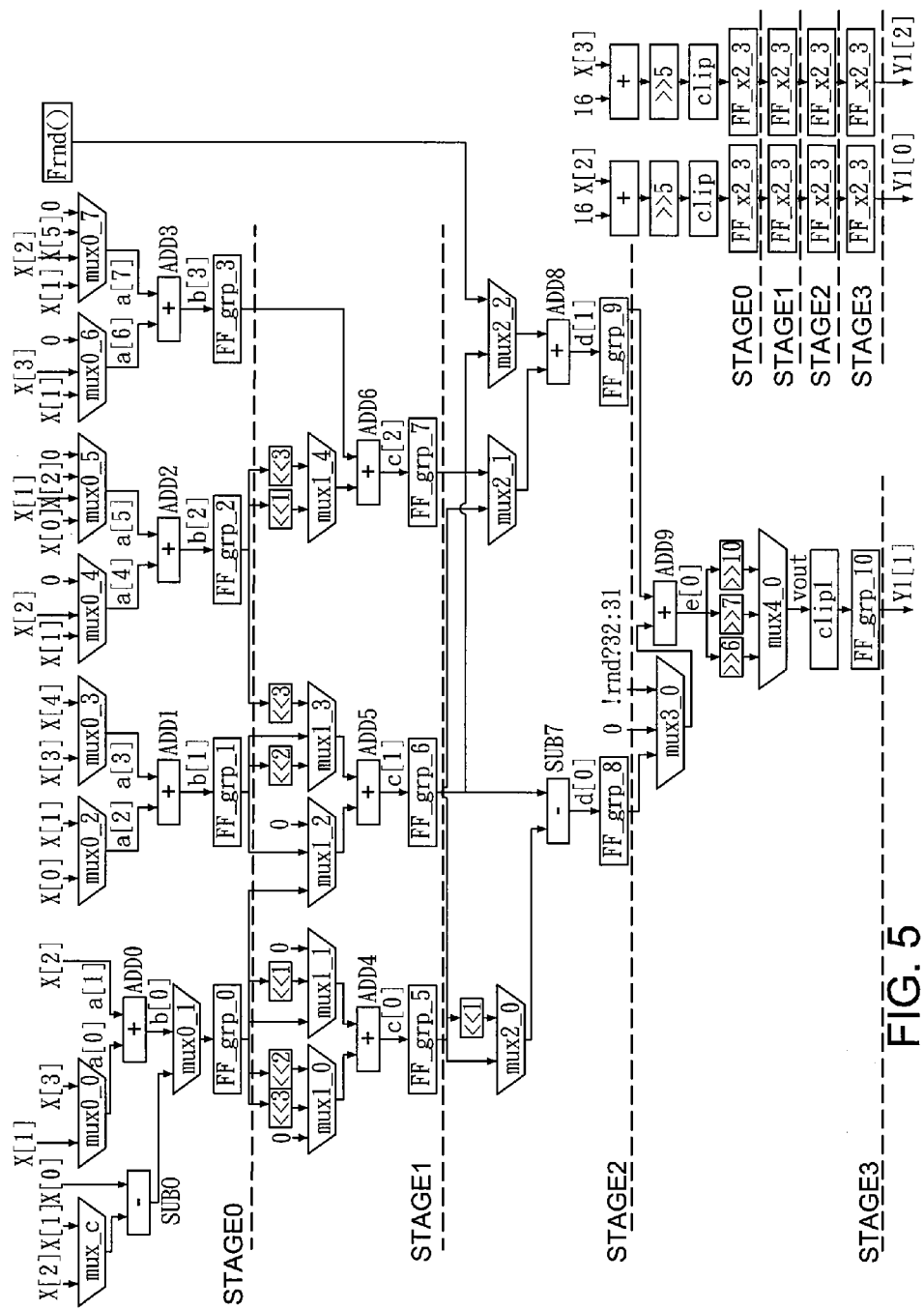
FIG. 5 illustrates example architecture of horizontal filters according to an embodiment of the present invention.

The common horizontal filter equation can also be realized by shifters, adders, subtracters and multiplexers. FIG. 5 illustrates example architecture of horizontal filters 140, 170, 240, 270 and 320 which is a realization of the common horizontal filter equation.

Horizontal filters 170 and 270 can be used for H264 standard only. Therefore, the architecture in such case need only to realize 6-tap horizontal filter equation to limit the logic used and area occupied.

Filter indicators 110, 210 and 310 provide information needed for vertical filters 120, 220, 340 and 370; horizontal filters 140, 170, 240, 270 and 320; and output units 180, 280 and 380 during each pipeline stage. Filter indicators 110, 210 and 310 have the same stage number so that the corresponding information is fed into each stage of each filter or output unit. The information is also transferred to the next stage like a pipeline.

Figure 6:
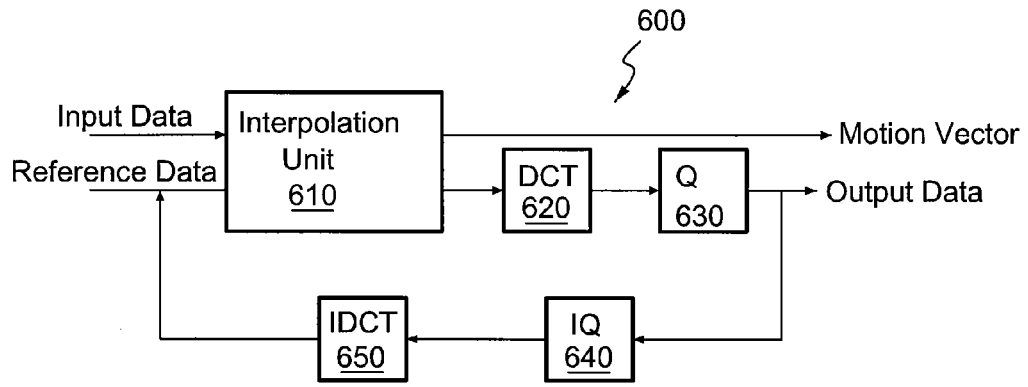
FIG. 6 illustrates a simplified block diagram of a motion compensation unit according to another embodiment of the present invention.

FIG. 6 illustrates a simplified block diagram of a motion compensation unit 600 according to another embodiment of the present invention. Motion compensation unit 600 comprises an interpolation unit 610, a discrete cosine transform (DCT) unit 620, a quantization unit 630, an inverse quantization unit 640 and an inverse DCT unit 650. Input data and reference data are fed into interpolation unit 610. Data after interpolation is then transformed by DCT unit 620 before being fed into quantization unit 630 for quantizing. Quantized data is output for further processing. A motion vector is also output by interpolation unit 610 also for further processing. Inverse quantization unit 640 and inverse DCT unit 650 form a feedback track, so that output data undergo inverse quantization and inverse DCT before being fed back to become the reference data. Motion compensation unit 600 is able to facilitate multiple video standards by applying interpolation unit 610 with interpolation units 100, 200 and 300 described above. Therefore, a multiple video standard motion compensation unit is achieved without sacrificing chip area requirements.

Figure 7:
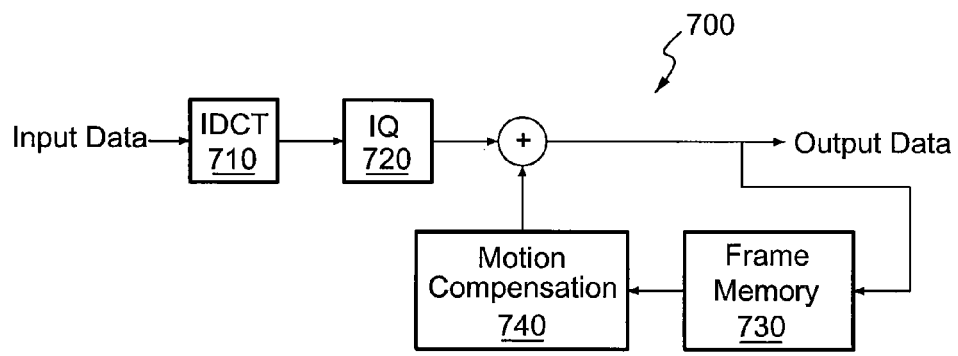
FIG. 7 illustrates a simplified block diagram of a decoder according to another embodiment of the present invention.

FIG. 7 illustrates a simplified block diagram of a decoder 700 according to another embodiment of the present invention. Decoder 700 comprises an inverse DCT unit 710, an inverse quantization unit 720, a frame memory 730 and a motion compensation unit 740. Input data, i.e. compressed data, is inversely transformed by inverse DCT unit 710 and subsequently inversely quantized by inverse quantization unit 720. Motion compensation factors output from motion compensation unit 740 are added to after inverse quantization. Output data is fed into motion compensation unit 740 through frame memory 730, and motion compensation unit 740 outputs motion compensation factors to be added to the next frame. Decoder 700 is able to facilitate multiple video standards by applying motion compensation unit 740 with motion compensation unit 600 described above. Therefore, a multiple video standards decoder is achieved without sacrificing chip area requirements.

EXAMPLE

Figure 8:
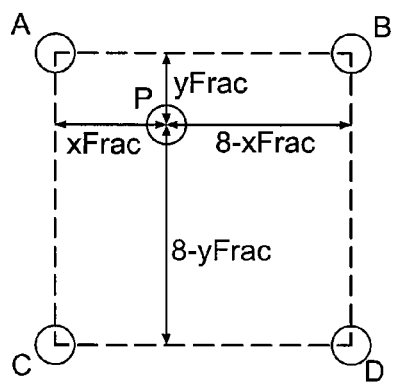
FIG. 8 illustrates an exemplary diagram of interpolation according to an embodiment of the present invention.

The prediction values for the chroma component in H.264 are always obtained by bilinear interpolation, as shown in FIG. 8, the positions labeled with A, B, C, and D represent chroma samples at full-sample locations inside the given two-dimensional array of chroma samples, and the sample values at sub-sample positions labeled as P are derived as follows:

$P$=(8-$x$Frac)*((8-$y$Frac)*$A$+$y$Frac*$C$)+$x$Frac*((8-$y$Frac)*$B$+$y$Frac*$D$)+32)>>6

In the proposed architecture, the vertical filter would calculate ((8-$y$Frac)*$A$+$y$Frac*$C$) and ((8-$y$Frac)*$B$+$y$Frac*$D$), and then horizontal filter would accomplish the next calculation for P.

Filter parameters are passed along the pipeline, and are used to control the parameters in vertical/horizontal filters together with the selector at the end of the pipeline, which contains multiplexers and averagers.

The above architecture accomplishes 2D interpolation in one unified method for multi-standard motion compensation. While consuming a small area, this simple and unified architecture of 2D interpolation, could achieve the same performance as the separated design, and thus meet the performance requirement of video standards. In view of hardware realization of the original algorithm, the improvement is significant.

The invention claimed is:

1. An apparatus for interpolation, comprising:
a first unit, for interpolating input data, that includes both a vertical filter for performing vertical filtering and a horizontal filter for performing horizontal filtering, wherein the vertical filter is configured to evaluate a merged equation comprising a 4-tap filter equation, a 6-tap filter equation, and an 8-tap filter equation by accepting inputs for a 4-tap filter equation, a 6-tap filter equation, and an 8-tap filter equation;
a second unit for interpolating input data;
a filter indicator for providing information to the first unit and the second unit; and
an output unit for multiplexing and averaging output from the first unit and the second unit,
wherein the vertical filter comprises a first stage configured to receive the inputs and generate a set of first stage signals in response to the interpolation inputs, a second stage configured to receive the set first stage signals and generates a set of second stage signals in response, a third stage configured to receive the set of second stage signals and generate a set of third stage signals in response, and a fourth stage configured to receive the set of third stage signals and generate a common virtual filter output in response, wherein the fourth stage includes a fourth stage multiplexer configured to select between an unshifted fourth stage signal, a three-place-shifted fourth stage signal, a five-place-shifted fourth stage signal, and a six-place-shifted fourth stage signal.

2. The apparatus according to claim 1, further comprising:
an input transpose buffer for transposing input data; and
a multiplexer for multiplexing input data and output of the input transpose buffer.

3. The apparatus according to claim 1, wherein the first unit further comprises a first buffer for storing an output of the vertical filter, and
the vertical filter performs vertical filtering of the input data; and
the horizontal filter performs horizontal filtering of the output of the first buffer.

4. The apparatus according to claim 1, wherein the first unit further comprises a first buffer for storing an output of the horizontal filter, and
the horizontal filter performs horizontal filtering of the input data; and
the vertical filter performs vertical filtering of the output of the first buffer.

5. The apparatus according to claim 1, wherein the second unit comprises:
a FIFO buffer for storing intermediate data;
a second buffer for storing output of the FIFO buffer; and
a horizontal filter for performing horizontal filtering of output of the second buffer.

6. The apparatus according to claim 1, wherein the second unit comprises:
a FIFO buffer for storing intermediate data;
a second buffer for storing output of the FIFO buffer; and
a vertical filter for performing vertical filtering of output of the second buffer.

7. An apparatus for motion compensation, comprising:
an interpolation unit for interpolation of reference data into input data, the interpolation unit comprising:
a first unit, for interpolating input data, that includes both a vertical filter for performing vertical filtering and a horizontal filter for performing horizontal filtering, wherein the vertical filter is configured to evaluate a merged equation comprising a 4-tap filter equation, a 6-tap filter equation, and an 8-tap filter equation by accepting inputs for a 4-tap filter equation, a 6-tap filter equation, and an 8-tap filter equation;
a second unit for interpolating input data;
a filter indicator for providing information to the first unit and the second unit; and
an output unit for multiplexing and averaging output from the first unit and the second units;
a discrete cosine transform (DCT) unit for performing discrete cosine transform of output of the unit;
a quantization unit for performing quantization of output of the DCT unit; and
a feedback unit,
wherein the vertical filter comprises a first stage configured to receive the inputs and generate a set of first stage signals in response, a second stage configured to receive the set of first stage signals and generate a set of second stage signals in response, a third stage configured to receive the second stage signals and generate a set of third stage signals in response, and a fourth stage configured to receive the set of third stage signals and generate a common virtual filter output in response, wherein the fourth stage comprises a fourth stage multiplexer configured to select between an unshifted fourth stage signal, a three-place shifted fourth stage signal, a five-place shifted fourth stage signal, and a six-place shifted fourth stage signal, and wherein the vertical filter.

8. The apparatus according to claim 7, wherein the interpolation unit further comprises:
an input transpose buffer for transposing input data; and
a multiplexer for multiplexing input data and output of the input transpose buffer.

9. The apparatus according to claim 7, wherein the first unit further comprises a first buffer for storing an output of the vertical filter, and
the vertical filter performs vertical filtering of the input data; and
the horizontal filter performs horizontal filtering of the output of the first buffer.

10. The apparatus according to claim 7, wherein the first unit further comprises a first buffer for storing an output of the horizontal filter, and
the horizontal filter performs horizontal filtering of the input data; and
the vertical filter performs vertical filtering of the output of the first buffer.

11. The apparatus according to claim 7, wherein the second unit comprises:
a FIFO buffer for storing intermediate data;
a second buffer for storing output of the FIFO buffer; and
a horizontal filter for performing horizontal filtering of output of the second buffer.

12. The apparatus according to claim 7, wherein the second unit comprises:
a FIFO buffer for storing intermediate data;
a second buffer for storing output of the FIFO buffer; and a vertical filter for performing vertical filtering of output of the second buffer.

13. The apparatus according to claim 7, wherein the feedback unit comprises:
an inverse quantization unit for performing inverse quantization of output of the quantization unit; and
an inverse DCT unit for performing inverse DCT of output of the inverse quantization unit and feeding an output back to the interpolation unit as the reference data.

14. A video decoder with motion compensation, comprising:
an inverse DCT unit for performing inverse DCT of input data;
an inverse quantization unit for performing inverse quantization of output of the inverse DCT unit;
a frame memory for storing frame output of the inverse quantization unit; and
a motion compensation unit for performing motion compensation of data stored in the frame memory and feeding an output into an adder which adds output of the inverse quantization unit with output of the motion compensation;
wherein the motion compensation unit comprises:
an interpolation unit for interpolation input data with a reference data, the interpolation unit comprising:
a first unit, for interpolating input data, that includes both a vertical filter for performing vertical filtering and a horizontal filter for performing horizontal filtering, wherein the vertical filter is configured to evaluate a merged equation comprising a 4-tap filter equation, a 6-tap filter equation, and an 8-tap filter equation by accepting inputs for a 4-tap filter equation, a 6-tap filter equation, and an 8-tap filter equation;
a second unit for interpolating input data;
a filter indicator for providing information to the first unit and the second unit; and
an output unit for multiplexing and averaging output from the first unit and the second unit,
wherein the vertical filter comprises a first stage configured to receive the inputs and generate a set of first stage signals in response, a second stage configured to receive the set of first stage signals and generate a set of second stage signals in response, a third stage configured to receive the second stage signals and generate a set of third stage signals in response, and a fourth stage configured to receive the set of third stage signals and generate a common virtual filter output in response, wherein the fourth stage comprises a fourth stage multiplexer configured to select between an unshifted fourth stage signal, a three-place shifted fourth stage signal, a five-place shifted fourth stage signal, and a six-place shifted fourth stage signal, and wherein the vertical filter.

15. The video decoder according to claim 14, wherein the interpolation unit further comprises:
an input transpose buffer for transposing input data; and
a multiplexer for multiplexing input data and output of the input transpose buffer.

16. The video decoder according to claim 14, wherein the first unit further comprises a first buffer for storing an output of the vertical filter, and
the vertical filter performs vertical filtering of the input data; and
the horizontal filter performs horizontal filtering of the output of the first buffer.

17. The video decoder according to claim 14, wherein the first unit further comprises a first buffer for storing an output of the horizontal filter, and
the horizontal filter performs horizontal filtering of the input data; and
the vertical filter performs vertical filtering of the output of the first buffer.

18. The video decoder according to claim 14, wherein the second unit comprises:
a FIFO buffer for storing intermediate data;
a second buffer for storing output of the FIFO buffer; and
a horizontal filter for performing horizontal filtering of output of the second buffer.

19. The video decoder according to claim 14, wherein the second unit comprises:
a FIFO buffer for storing intermediate data;
a second buffer for storing output of the FIFO buffer; and
a vertical filter for performing vertical filtering of output of the second buffer.

20. The video decoder to claim 14, wherein the motion compensation unit further comprises:
a discrete cosine transform (DCT) unit for performing discrete cosine transform of output of the interpolation unit;
a quantization unit for performing quantization of output of the DCT unit; and
a feedback unit, wherein the feedback unit comprises:
an inverse quantization unit for performing inverse quantization of output of the quantization unit; and
an inverse DCT unit for performing inverse DCT of output of the inverse quantization unit and feeding an output back to the interpolation unit as the reference data.

* * * * *